K. BRÜLL.
ELECTRIC CONTROL GEAR FOR AUTOMATIC GRAB CRANES.
APPLICATION FILED SEPT. 27, 1911.
1,134,370.
Patented Apr. 6, 1915.
4 SHEETS—SHEET 1.
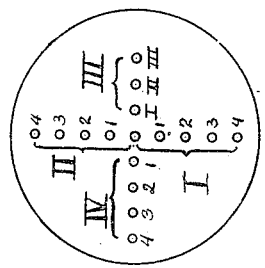
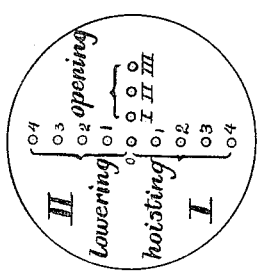
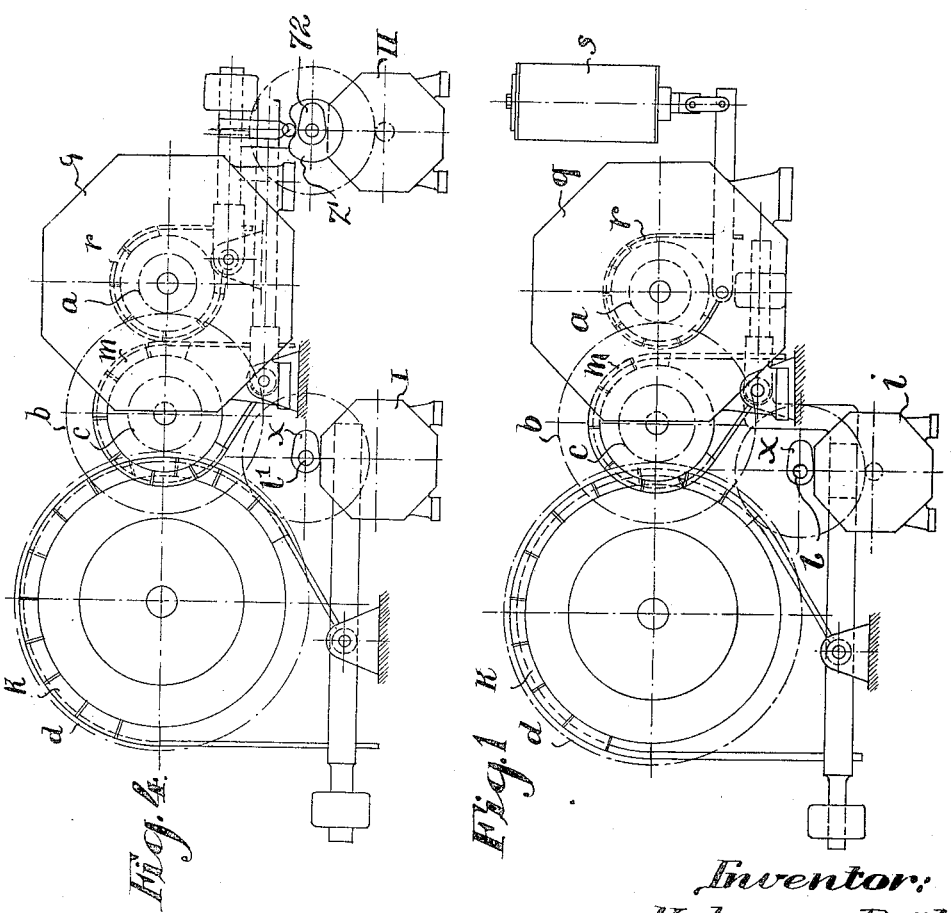
Inventor:
Koloman Brüll

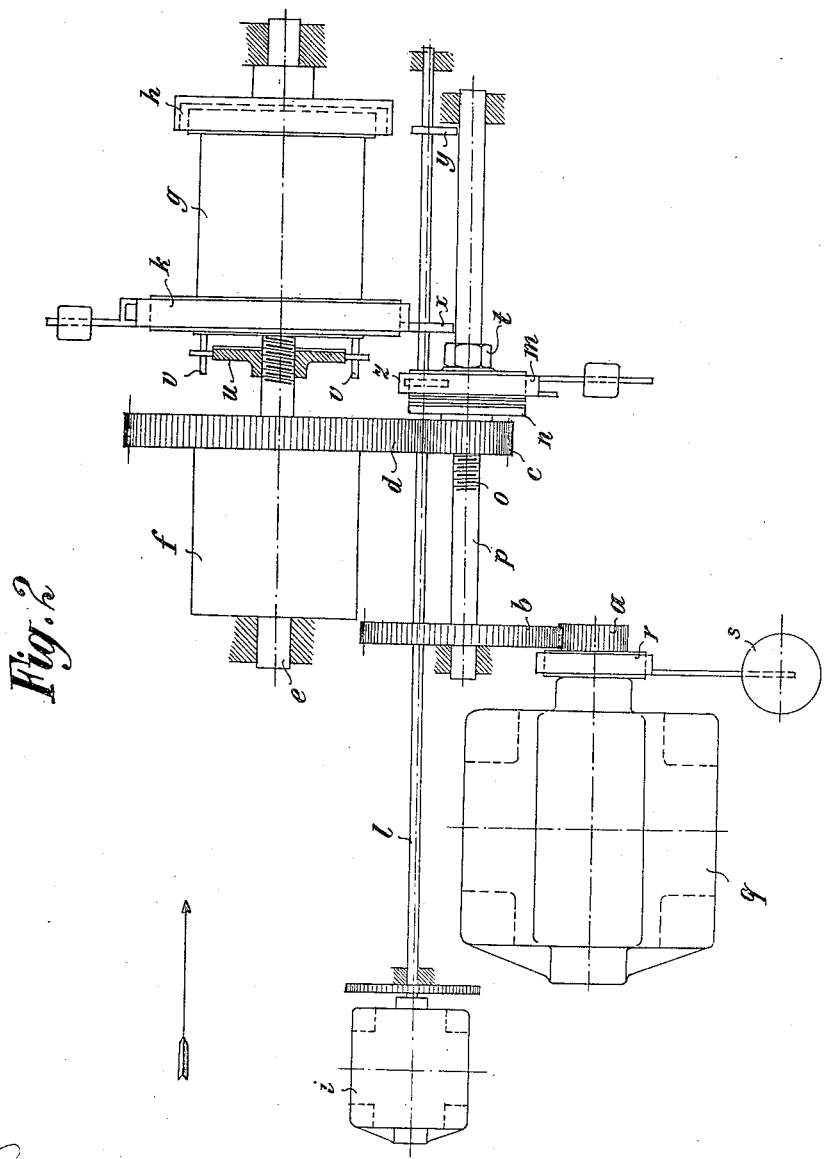

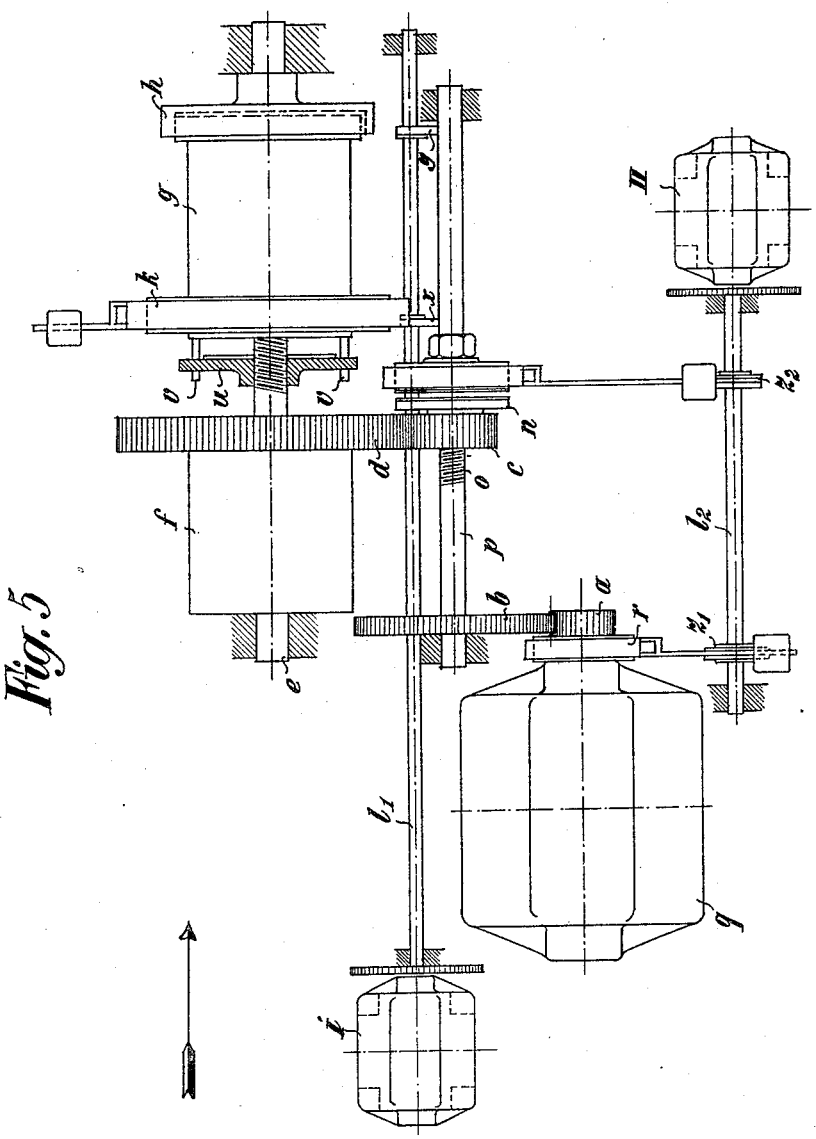

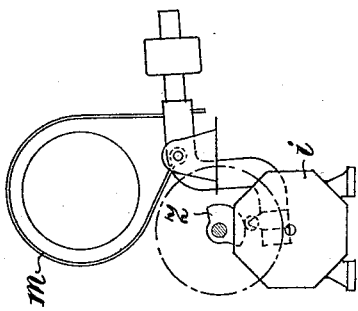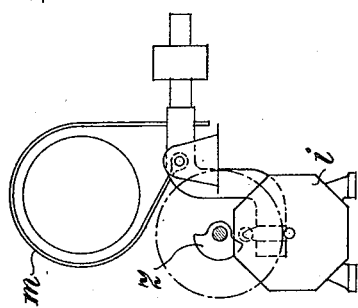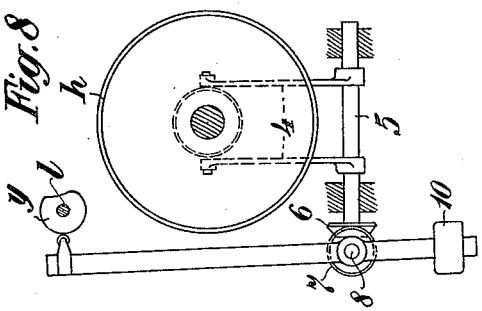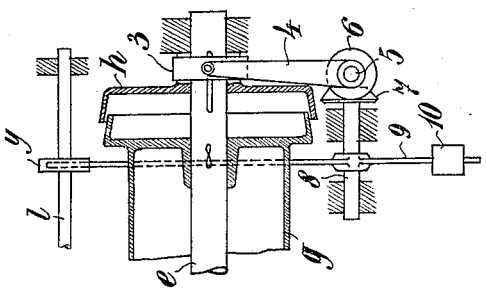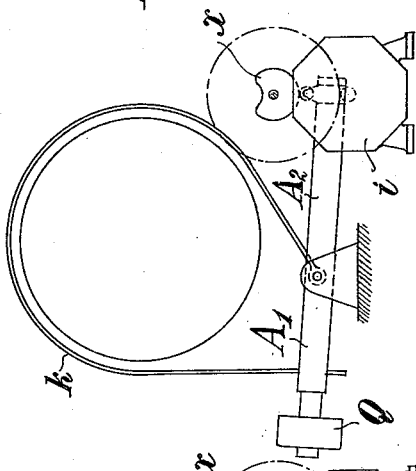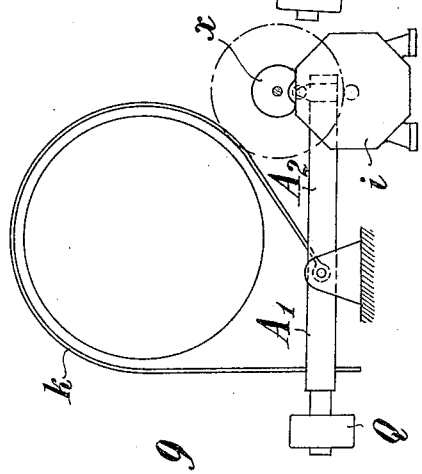

UNITED STATES PATENT OFFICE.

KOLOMAN BRÜLL, OF PESTSZENTLÖRINCZ, AUSTRIA-HUNGARY.

ELECTRIC CONTROL-GEAR FOR AUTOMATIC GRAB-CRANES.

1,134,370. Specification of Letters Patent. Patented Apr. 6, 1915.

Application filed September 27, 1911. Serial No. 651,649.

*To all whom it may concern:*

Be it known that I, KOLOMAN BRÜLL, a subject of the King of Hungary, residing at Pestszentlörincz, Austria-Hungary, have invented certain new and useful Improvements in Electric Control-Gear for Automatic Grab-Cranes, of which the following is a specification.

Attempts have frequently been made to simplify the operation of automatic crane grabs. Thus, for example it has been proposed to utilize a special motor medium (water under pressure or electricity) for closing the jaws of the grab but these experiments have not so far produced results of practical importance in view of the fact that a motor which would close the jaws of the grab very quickly would have to be of approximately the same power as the lifting motor, which would result in excessively increasing the dead weight of the conveyer upon which the apparatus is mounted.

As is known the hoisting gear for grabs is generally provided with two drums one of which is able to rotate independently of the other during the closing or emptying operation. This independent operation of the drums, that is to say, the retention of the drum for opening the jaws of the grab during the operation of the grab closing drum, is attained in the great number of known forms of grab winding gear, owing to the fact that the driver of the crane renders one drum operative by means of various levers through a friction clutch, while he retains the other by applying a brake. In these constructions, in which both drums are mounted loosely on their shaft, each drum comprises a friction clutch and a brake so that four levers are necessary for controlling the lifting gear alone in addition to the starting lever.

In the case of other grab winding gears provided with simplified control the number of levers necessary to be operated are reduced by suitable mechanical devices to two or even to a single lever but in addition to the controller the driver has also a certain number of levers to operate. In addition to the inconvenience of this arrangement it presents the grave defect that in the case of overhead traveling cranes, in which the hoisting line alters its position relatively to the driver's position, there are numerous other controlling devices to which the driver must attend incident to the guidance of the several cables.

The present invention has for its object to simplify as far as possible the control of the crane grab hoisting gear; the driver has only to attend to the controller since the actual maneuvering of the grab takes place automatically by means of a brake motor.

A further object of the invention is to eliminate the cable guides completely as the entire mechanism is combined with the grab mechanism.

The apparatus further presents greater security in the event of the current being interrupted, than the devices heretofore constructed; as in the present case the load is retained by a plurality of automatic brakes.

Two embodiments of the invention are illustrated by way of example in the accompanying drawings in which:

Figure 1 illustrates in diagrammatic form an end elevation of the arrangement shown in Fig. 2 (looking in the direction of the arrow). Fig. 2 is a plan view (with parts shown in section) of one form of my invention. Fig. 3 is a diagrammatic view of the cover of the controller, with which it is only possible to hoist the grab with closed jaws, said controller being adapted for the construction shown in Figs. 1, 2 and 4. Fig. 4 is a view similar to Fig. 1, looking at Fig. 5, in the direction of the arrow. Fig. 5 is a plan view of the arrangement of a modified form of my invention with parts shown in section. Fig. 6 shows a diagrammatic view of the cover of the controller adapted for hoisting the grab with the jaws open. Figs. 7 to 12 are detail views.

By means of gear wheel transmissions —*a—b*— and —*c—d*— the hoisting motor —*q*— drives the drum —*f*— keyed upon the shaft —*e*— and which closes the grab jaws. The drum —*g*— for opening the grab is loosely mounted on the same shaft but can be clutched to the shaft by the friction clutch —*h*— rendered operative by means of a weight —10—. One form of the carrying out of the clutch is illustrated in Figs. 7 and 8 which show the clutch in its released position. The disk *h*, keyed upon the shaft *e*, may be displaced along this shaft, and by pressing it with its coupling cone against the corresponding counter-cone of the drum *g*, this latter will be engaged with its shaft. Removing the disk *h* from the drum *g* the clutch is released. There is a casing upon the hub of the disk $h$ which is engaged on both sides with levers 4, which may be turned by the shaft 5. The bevel wheel 6 on this shaft meshes with the bevel wheel 7 keyed upon shaft 8, which latter is turned by the weight 10, resting upon one arm of the lever 9 while the other lies in the pathway of the cam $y$ of the operating shaft 1.

The cam $y$ is of such shape that when its circular surface is presented to the portion of lever arm 9 resting thereon, said lever-arm will be pressed down, the weight 10 lifted, and the clutch released. Upon rotation of the cam $y$ the flattened portion comes in contact with the lever 9, at which time the weight 10 is able to freely descend and the clutch is rendered operative.

A brake —$k$— is operatively connected with the drum —$g$—; this brake is released by means of the motor $i$ for operating the said brake owing to the fact that upon the rotation of the brake motor in the corresponding direction the cam —$x$— mounted on the operating shaft of the brake motor lifts the brake weight Q, Figs. 9, 10. The armature of the brake motor $i$, for controlling the shaft 1 is adapted to assume three different positions, viz, a normal zero position, when there is no current passing through it, a second position at 120° plus when the current is on and motor $q$ is operating for hoisting and a third position at 120° minus when the current is reversed and motor $q$ is operating for lowering the grab bucket. The arrangement is such that upon shutting off the current when the motor $i$ is in either the second or third position, its armature automatically returns to the zero position.

A ratchetless thrust bearing brake —$m$— is mounted on the shaft —$p$— the toothed wheel —$c$— being keyed to the plate —$n$—. The plate —$n$— can be removed from the plate —$m$— by reason of the provision of the screw thread —$o$—. —$r$— is the stopping brake and —$s$— brake magnet thereof.

In addition to the cams —$x$— and $y$ serving to the control of brake $k$ and clutch $h$ respectively, there is a third cam $z$ mounted on the operating shaft 1 which serves to control the thrust bearing band brake $m$ (Figs. 11–12).

A plate —$u$— is mounted in front of the drum —$g$—, this plate is retained against rotation by means of bolts —$v$— mounted on the drum —$g$— and is displaced along the shaft on a screw thread and pressed against the drum —$g$—.

The device acts in the following manner: Assuming that the filled grab is to be lowered, the driver sets the controller handle on the "lowering" position of the controller diagram and the hoisting and brake motors receive current. This causes the hoisting motor —$q$— to run in the lowering direction thus driving through the transmissions —$a$— $b$— and —$c$ $d$— the closing drum —$f$— keyed on the shaft —$e$—. The drum —$g$— for opening the grab is also driven simultaneously as the friction clutch —$h$— which is rendered operative by a weight 10, Figs. 7–8 clutches this drum to the shaft —$e$—. Both drums move downward with the same speed and the closed grab descends. In this condition of the movement the brake motor —$i$— which has rotated in the corresponding direction releases the stopping brake —$k$— operatively connected with the drum —$g$— owing to the fact that a cam —$x$— mounted on the operating shaft —$l$— of the brake motor lifts the brake weight Q, Figs. 9–10. The brake plate —$m$— of the ratchetless thrust bearing brake is not released during the lowering movement and the gear wheel —$c$— keyed to the plate —$n$— separates from the plate —$m$— by reason of the screw thread —$o$— on the shaft —$p$—. The grab is able to descend freely but not at a greater speed than that imparted by the hoisting motor —$q$—. If it is desired to stop the closed grab in any position it is only necessary to cut off the current from motors $q$ and $i$, the latter will then return to its zero position permitting clutch $h$ to be released and brakes $k$ and $m$ to be applied. If the driver wishes to open the grab he switches in the opening contacts on the controller. The hoisting motor is operated in the lowering direction. The brake motor remains uninfluenced. The drum for opening the grab continues to be held but the drum for closing it moves and the jaws of the grab open. This opening takes place only with the speed corresponding to that imparted by the hoisting motor as otherwise the plate —$n$— with the gear wheel —$c$— is pressed against the retained brake plate —$m$—. If the opened gripper or grab is to be lowered further the lowering scale is again switched in on the controller. Both the drums move with the same velocity and the open grab is lowered. When the opened grab has again reached a place where it can seize material the lowering movement is stopped and the hoisting contacts are switched in on the controller. The hoisting motor —$q$— moves in the hoisting direction and the braking motor rotates in the proper direction, the three cams —$x$, $y$, $z$— mounted on the operating shaft of the brake motor simultaneously releasing the clutch —$h$— the stopping brake —$k$— and the thrust bearing brake —$m$—. By means of the screw thread —$o$— the plate —$n$— is pressed against the loose brake plate —$m$— its axial movement being stopped by the nut —$t$—, thereby locking it to the shaft —$p$—. The drum for closing the grab becomes operative while the drum for opening it is stationary. The grab jaws are closed. At this moment the plate —$u$—, which is retained against rotation by the bolts —$v$—$v$— on the drum for opening the grab engages with this drum and drives it. During the opening operation the plate —$u$— separates from the drum —$g$— so that its interval is always the same and fully corresponds to the lost motion necessary during the closing operation of the grab. The controller used here is operated upon as follows: in Fig. 3, section I are the hoisting contacts section II the lowering contacts, and section III the contacts for the opening of the grab.

The controller lever has its normal or resting position at O and is moved along contacts 1, 2, 3, 4 of section I when the grab is to be hoisted along contacts 1, 2, 3, 4 of section II when the grab is to be lowered, while the opening of the grab is effected by switching the contacts I, II, III of section III.

Another alternative of the device which enables an enlarged automatic control of the grab is illustrated in Figs. 4–6 of the accompanying drawings.

The main difference between the two arrangements is the replacing of the brake magnet —$s$— illustrated in Figs. 1 and 2 by brake motor II (Figs. 4 and 5). As these figures show the brake motor I operates here only the clutch —$h$— and the brake —$k$— by means of the cams —$x$— and —$y$—. The bandbrake part —$m$— of the thrust bearing brake is released by the cam —$z_2$— the stop brake —$r$— on the main motor shaft is released by the cam —$z_1$—. The cams —$z_1$— and —$z_2$— mounted on the shaft —$1_2$— are rendered operative by the brake motor II. This arrangement makes it possible to hoist the grab with open jaws. For this purpose the controller has not three but four sections and the section IV with its contacts 1, 2, 3, 4 serves to hoist the grab with its open jaws. The connections of the contacts of section IV with the hoisting motor —$q$— and the brake-motors I and II are made in such a way that moving the controller lever along these contacts the hoisting motor and the brake-motor II receive current corresponding to the hoisting direction, while the brake-motor I receives current corresponding to the lowering direction. The grab with its open jaws will be hoisted then, even when starting this movement, the bucket is suspended, because the clutch —$h$— being closed, the brake —$k$— being released both drums will be moved upward simultaneously. As will be understood from the preceding description the driver of the crane has only to operate upon the controller in attending the grab hoisting gear. In view of this arrangement overhead cranes provided with a stationary driver's stand can be constructed and all the movements of the grab traveler comprising the entire mechanism are controlled electrically. By this means a number of cable and guide rollers are dispensed with and the efficiency of the apparatus is greatly improved.

I do not wish to be limited to the particular forms herein set forth, as the present invention may be embodied in various other forms and modifications.

I claim:

1. Electric control gear for automatic grab cranes comprising a shaft, a grab closing drum fast thereon, a motor for driving said drum, driving connections between said motor and said drum, a brake adapted to operate on said connections, a grab opening drum loose on said shaft, a clutch for connecting said opening drum to the shaft, a brake for retaining said opening drum during the opening of the grab, a cam shaft having operative connections with said clutch and both of said brakes, electric means for controlling said shaft, and a common control for said driving motor and said electric means controlling the cam shaft, substantially as described.

2. Electric control gear for automatic grab cranes comprising a shaft, a grab closing drum keyed thereon, a motor for driving said drum, reduction gearing coupling said drum with said motor, a brake operatively connected with said gearing, a grab opening drum loosely carried on said shaft, a clutch for positively coupling said opening drum to the shaft, a brake for retaining said opening drum during the opening of the grab, a cam shaft having operative connections with said clutch and said brakes respectively, a brake motor adapted to control the movements of said cam shaft, and a common control for said driving and brake motors, respectively, substantially as described.

In testimony whereof I affix my signature in presence of two witnesses.

KOLOMAN BRÜLL.

Witnesses:
 MAX ADLER,
 HUGH KEMENY.

Copies of this patent may be obtained for five cents each, by addressing the "Commissioner of Patents, Washington, D. C."